Patented Feb. 28, 1928.

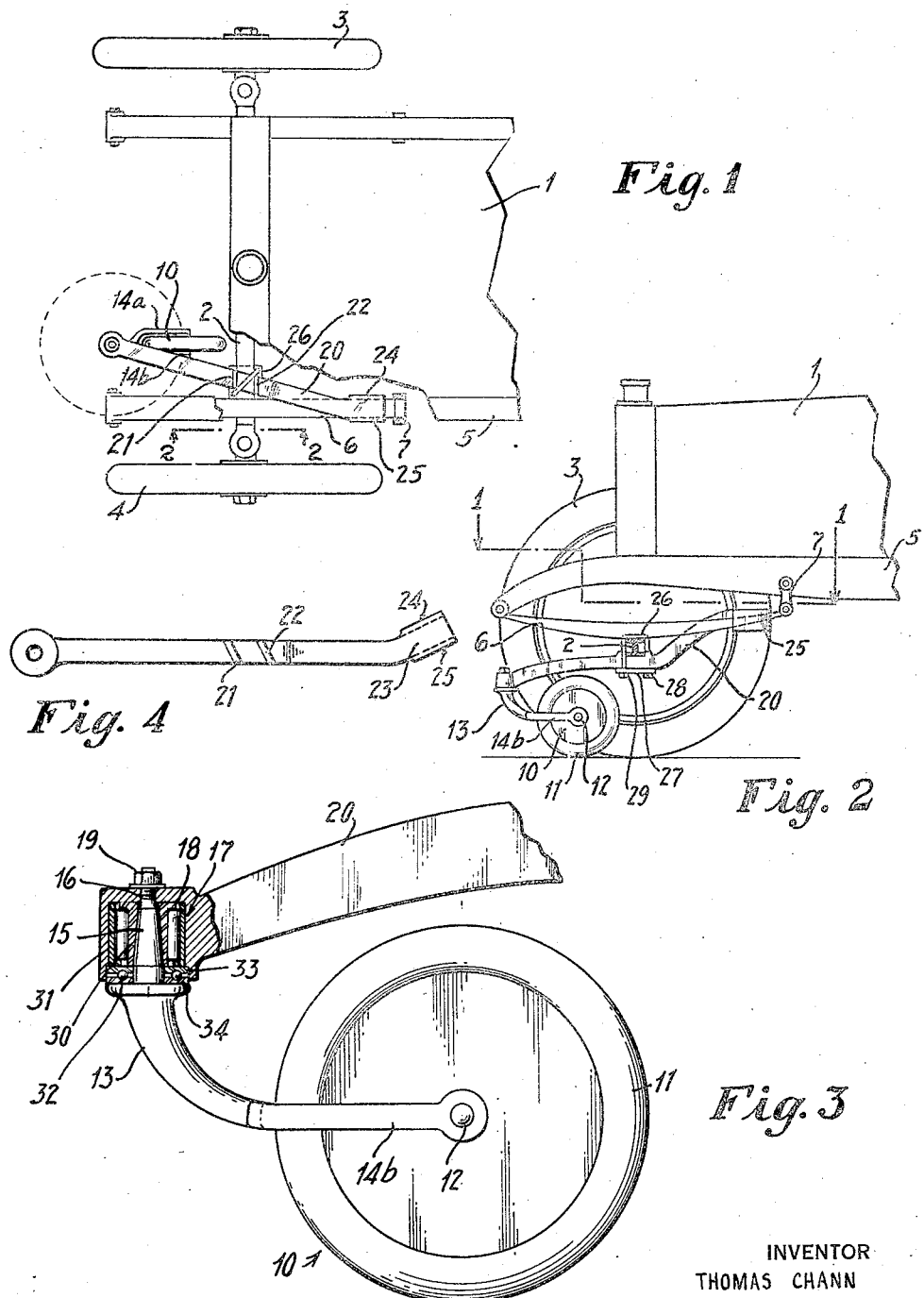

1,660,704

UNITED STATES PATENT OFFICE.

THOMAS CHANN, OF NEW YORK, N. Y.

SPARE WHEEL FOR EMERGENCY.

Application filed April 1, 1927. Serial No. 180,310.

This invention relates to an emergency wheel rig for vehicles and more particularly, to an emergency wheel and support therefor which may be carried as a spare or accessory, by automotive vehicles such as passenger cars, trucks, and the like.

In many cases of accidents to automotive vehicles, where only relatively slight damage is done to the vehicle, a relatively heavy expense may be involved to repair the damage; particularly is this true when only a slight amount of damage is done to one side of the vehicle resulting in a bent axle, a bent or broken tie rod or damage to one of the front wheels. This usually necessitates a call to a service station and a service or towing car is required to proceed to the scene of the accident, and usually finds it necessary to tow the damaged car to the garage or service station. Usually this is done by means of a crane which lifts the damaged end of the vehicle into the air and tows it in that position. Such services, in themselves, are usually expensive and frequently constitute the major part of the expense necessary to place the damaged vehicle in operating condition.

It is an object of this invention to provide apparatus which may be carried as an accessory or spare part, and which may be quickly and easily applied to the damaged vehicle by the lay driver, with only the tools which are usually found in a vehicle, and which, when applied, will permit the vehicle to be driven.

It is a further object of this invention to provide such apparatus which shall be relatively simple, inexpensive, and reliable and which will be firmly secured in position to permit the vehicle to proceed at normal travelling speed, under full control of the steering gear, by maintaining the damaged wheel out of contact with the ground or out of weight carrying relation with the vehicle.

Still other objects and advantages of my invention will be apparent from the specification.

The features of novelty which I believe to be characteristic of my invention are set forth with particularity in the appended claims. My invention itself, however, both as to its fundamental principles and as to its practical embodiments will best be understood by reference to the specification and accompanying drawing, in which:—

Fig. 1 is a top plan view of a vehicle partly in section, on lines 2—2 of Fig. 2, and showing apparatus according to my invention.

Fig. 2 is a partial side elevation partly in section on lines 2—2 of Fig. 1.

Fig. 3 is a detail view partly in section; and,

Fig. 4 is a top plan view of the supporting arm.

In accordance with my invention, I provide an emergency wheel journalled upon an axle carried upon a swingable arm. This swingable arm is pivotally mounted upon a support which is adapted to be secured upon the axle and frame, or upon the axle and spring, or upon some other suitable part of the vehicle, in such manner as to support one end of the axle of the vehicle; and preferably, suitable clamping means are provided for securing this support firmly in position whereby the vehicle may be safely driven. The swingable arm upon which the emergency wheel is mounted for rotation, is pivoted to the support at a point eccentric to the axle of the emergency wheel, and a suitable thrust bearing is provided in such manner that the swingable arm is freely rotatable through 360° upon the thrust bearing under the weight of the vehicle or that portion of it which is carried upon the emergency wheel.

In case of accident or damage to one of the wheels of the vehicle, it is only necessary to jack the vehicle up in such manner as to raise the damaged wheel off the ground to afford sufficient clearance to insert the support in the proper place under the axle and over the spring, for example, of the vehicle. The support is firmly secured in position, after which the jack may be removed and the weight of the vehicle will be carried upon the emergency wheel instead of upon the damaged wheel. The vehicle may then be driven, and the effect of the eccentric mounting of the swinging arm will be such that the emergency wheel will always track properly, and the vehicle may be steered by the steering gear operating on the remaining good wheel.

Referring now more particularly to Fig. 1, 1 designates generically a motor vehicle having a front axle 2, and front wheels 3 and 4. The vehicle is provided with a main frame 5 and the usual springs 6 and spring shackles 7. The vehicle may also have a suitable steering mechanism, but since this is per se no part of my invention, the same is not shown. The emergency wheel 10, preferably provided with a suitable resilient tire 11 such as rubber, is mounted upon an axle 12 carried by forks 14ª and 14ᵇ of swinging arm 13. The arm 13 is provided at its upper extremity with a suitable thrust bearing surface which may, for example take the form of cone 15, and an extension 16 which may be threaded to receive the nut 19: a support 20 for the swinging arm 13 is provided with a cooperating thrust bearing 17 comprising inner and outer races 30 and 31 and interposed rollers 18 and balls 32 and thrust collars 33 and 34 for the purpose of rendering the arm 13 freely swingable when in normal weight carrying relation to the member 20. It will be understood that my invention is not limited to any particular form of thrust bearing but that other forms of bearings may be utilized for the purpose.

The arm 20 may be provided on its upper surface with a pair of parallel ridges 21 and 22 adapted to receive between them the axle 2 of the vehicle and to prevent shifting of the arm 20 with respect to the axle. The member 20 may terminate in an angularly disposed portion 23, having downwardly extending side portions 24 and 25 adapted to receive between them the spring: and since the axle and springs are usually disposed at right angles to each other, the ridges 21 and 22 and the angularly disposed portion 23 are so arranged. A suitable clamp 26 and a cooperating plate or strap member 27 may be provided, to be held in position by nuts 28 and 29, for the purpose of holding the support 20 in proper position with reference to axle 2.

The exact proportioning, size and shape of the various parts may be varied as may be dictated by the design of the particular type of vehicle to which the wheel is to be applied: for example, the size of the wheel 10, the length and shape of the arm 13, and the length and shape of the support 20 as well as the strength of each of the members, may be varied in accordance with the type, arrangement, and weight of the vehicle, the essential thing being that sufficient clearance should be provided to permit 360° rotation of the arm 13 in its bearing under the load which it is to carry. The wheel 10 will preferably be designed to be the maximum available size, in order to safeguard against damage by ruts, holes in the road, and the like.

In the use of apparatus according to my invention, in case the wheel 4 is damaged by collision or otherwise to a point which makes it undesirable or impossible to drive the vehicle, the wheel may be raised by placing a jack under one end of the axle 2: after the wheel is raised to the desired height, the support 20 may be placed in position as shown, in such manner that the axle 2 lies between the positioning ridges 21 and 22 and the rear portion 23 engages the rear end of spring 6. The clamp 26 may then be placed in position upon the axle 2, plate 27 placed across the end of the clamp 26, and nuts 28 and 29 tightened to securely clamp the support 20 in position against the axle: under these conditions, the positioning members 21 and 22 and the clamping member 26 together with the downwardly extending faces 24 and 25 engaging the spring 6, all cooperate to secure the support firmly in position. The jack may then be removed when it will be found that the emergency wheel 10 will be carrying its part of the load of the weight of the vehicle, and the wheel 4 will be out of contact with the ground. The vehicle may now be driven, and if the wheel 3 can be operated by the steering gear, it is possible to steer to vehicle as desired, the direction being determined by the wheel 3. The action of the swinging arm 13 pivoted at 15 at a point horizontally offset from the axle 12 of the emergency wheel 10, will cause this wheel to track properly, as will be readily understood. Under these conditions, the vehicle may be driven at the usual rate of speed to a point at which permanent repairs may be effected most economically.

While I have shown and described certain preferred embodiments of my invention, it will be apparent that modifications and changes may be made without departing from the spirit and scope of my invention.

I claim:

1. An emergency wheel rig for vehicles comprising a wheel rotatably mounted upon an axle, an arm carrying said axle, and a support arranged to be secured to a part of the vehicle separated by springs from the body of said vehicle, said arm being pivotally mounted on said support at a point horizontally offset from said axle.

2. An emergency wheel rig for vehicles comprising a wheel rotatably mounted upon an axle, an arm carrying said axle, and a support arranged to be secured to a part of the vehicle separated by springs from the body of said vehicle, said arm being pivotally mounted on said support at a point vertically and horizontally offset from said axle.

3. An emergency wheel rig for vehicles, comprising a wheel rotatably mounted upon an axle, an arm carrying said axle, and a support arranged to be secured to a part of the vehicle separated by springs from the body of said vehicle, said arm being pivotally mounted on said support in a thrust bearing, the axis of which is horizontally offset from said axle.

4. An emergency wheel rig for vehicles, comprising a wheel rotatably mounted upon an axle, a support adapted to be secured to a vehicle, and an arm carrying said axle pivotally secured to said support for free rotation through 360° about said pivot, said arm being so arranged that the center line of said wheel and the center line of said pivot are horizontally offset from each other and being arranged to engage the under side of an axle of said vehicle and the upper side of the spring supporting said axle.

5. The combination with a vehicle, of an emergency wheel, and means for securing the emergency wheel to said axle of said vehicle and to the spring supporting said axle in such manner that said wheel is freely rotatable about its center, and also about an axis external thereto.

6. The combination with a vehicle of an emergency wheel, a swingable arm mounted for free rotation through 360° on a vertical axis carrying said wheel, and a support for said arm passing under one axle of said vehicle, and over the spring supporting said axle, to maintain said emergency wheel in vehicle supporting position.

7. An emergency wheel rig for vehicles, comprising a wheel rotatably mounted upon an axle, an arm carrying said axle and a support arranged to be attached to the vehicle in such a manner that road shocks are transmitted to the vehicle only through the springs of the vehicle, said arm being pivotally mounted on said support for free rotation through 360°.

8. An emergency wheel rig for vehicles, comprising a wheel rotatably mounted upon an axle, an arm carrying said axle and a support, said arm being pivotally mounted on said support for free rotation through 360° on a vertical axis, said support being arranged to engage an axle of said vehicle in weight carrying relation, and slidably engaging the spring supporting said axle whereby road shocks are transmitted to the body of said vehicle only through the springs of the vehicle.

Signed at New York in the county of New York and State of New York, this 29th day of March A. D. 1927.

THOMAS CHANN.